(12) United States Patent
Gaddam et al.

(10) Patent No.: US 8,914,449 B2
(45) Date of Patent: Dec. 16, 2014

(54) PUSH MESSAGING PLATFORM WITH HIGH SCALABILITY AND HIGH AVAILABILITY

(75) Inventors: Venkat Gaddam, Bridgewater, NJ (US); Shahid Ahmed, Monmouth Junction, NJ (US); Sankar Shanmugam, Dayton, NJ (US); SM Masudur Rahman, Edison, NJ (US); Zhen Qin, Green Brook, NJ (US); Gayathri Chandrasekaran, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 77 days.

(21) Appl. No.: 13/290,812

(22) Filed: Nov. 7, 2011

(65) Prior Publication Data
US 2013/0117382 A1 May 9, 2013

(51) Int. Cl.
*G06F 15/16* (2006.01)
*H04W 4/00* (2009.01)
*H04L 29/08* (2006.01)
*H04L 12/18* (2006.01)
*H04L 12/58* (2006.01)

(52) U.S. Cl.
CPC ............ *H04L 12/1859* (2013.01); *H04L 12/587* (2013.01); *H04L 67/26* (2013.01); *H04L 12/5895* (2013.01); *H04L 67/04* (2013.01); *H04L 67/1002* (2013.01); *H04L 67/1036* (2013.01)
USPC .......................................... 709/206; 370/331

(58) Field of Classification Search
USPC ........................................................ 709/206
See application file for complete search history.

(56) References Cited

U.S. PATENT DOCUMENTS

| 2011/0110333 A1* | 5/2011 | Chen ............................. 370/331 |
| 2012/0166286 A1* | 6/2012 | Schuster et al. ........... 705/14.64 |

OTHER PUBLICATIONS

Erlang_IBM, May 10, 2011, IBM.*
Erlang_System, Feb. 25, 2013, Ericsson AB.*

* cited by examiner

*Primary Examiner* — Emmanuel L Moise
*Assistant Examiner* — Mahran Abu Roumi

(57) ABSTRACT

A push messaging platform includes a push server system having push engines (PE) for maintaining persistent connections with mobile devices, and push controllers (PC) for maintaining records of mobile devices' connections. The platform provides high scalability by including a load balancer for distributing connection requests received from mobile devices across the PEs, and dispatchers for forwarding each received message to a PC associated with the mobile device identified in the message. The platform provides high availability by using local backup PCs and remote mirror PCs. A global registered process (GRP) on each PC is linked to a process on a backup PC, and the backup process replaces the GRP if the GRP fails. Local registered processes (LRP) on each PC are linked to corresponding processes on a remotely located mirror PC, and the mirror process replaces the LRP if the LRP fails.

21 Claims, 10 Drawing Sheets

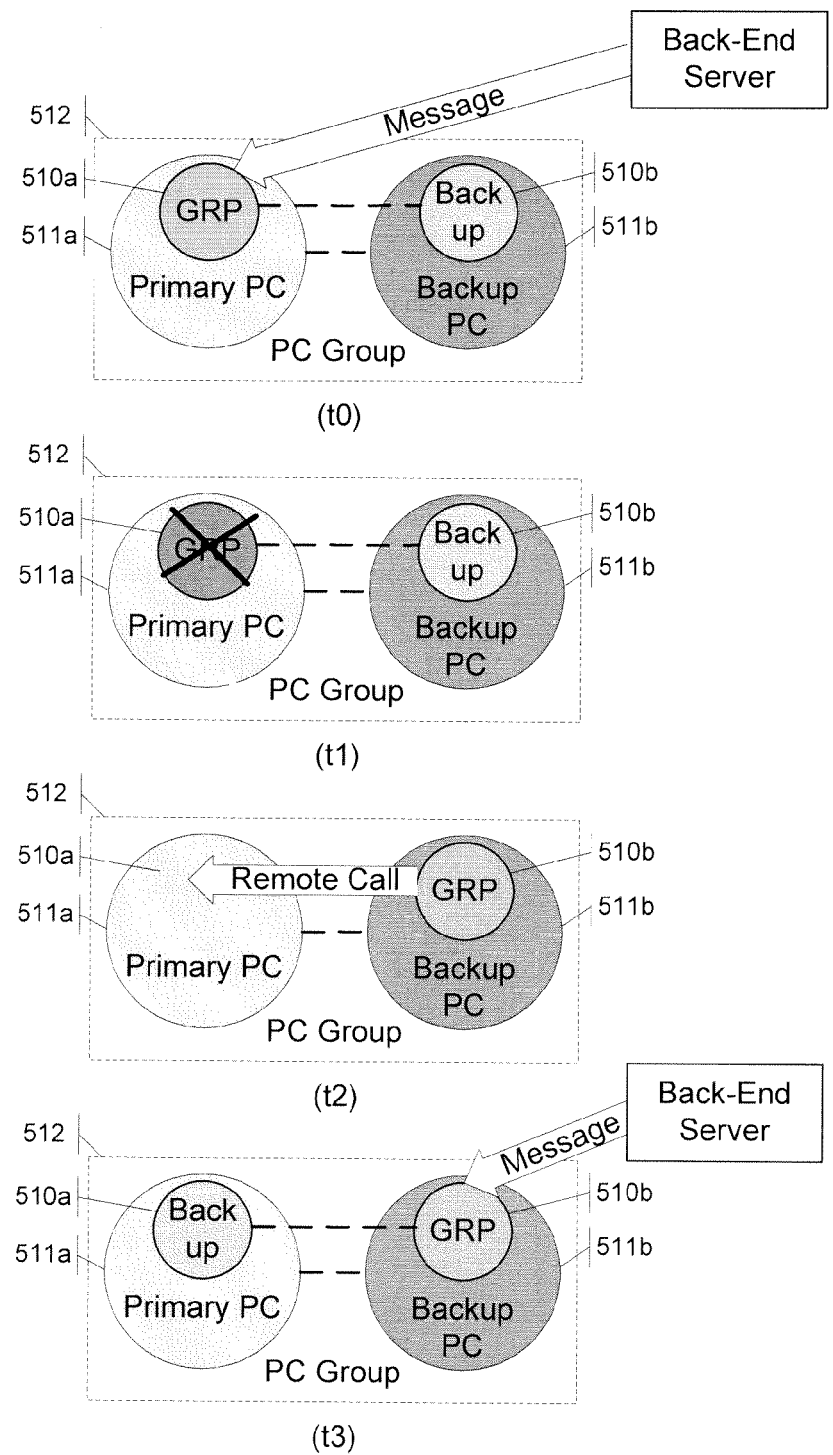

PUSH MESSAGING PLATFORM WITH HIGH SCALABILITY AND HIGH AVAILABILITY

BACKGROUND

In recent years, various methodologies have been developed to enable service provider servers to initiate the sending of data and notifications to smartphones or other mobile devices.

Modern networks and many mobile devices support wireless packet data communication to and from the mobile devices. These capabilities offer users a wide range of desirable communication features, such as email, web surfing, application selection and downloading, media content selection and downloading, etc. For many of the features or services, the mobile devices generally operate as clients with respect to service provider servers, and the mobile devices must themselves initiate all data communications with the service provider servers. As a result, if a service provider or other server wants to send a notification or other data communication to a mobile device, the server must wait for the mobile device to establish a data communication connection with the server. To enable more timely data communication to mobile devices, service providers have developed workaround methods to enable the service provider servers to indirectly initiate data communications with mobile devices. The workaround methods rely on short message service (SMS) messages to provide the mobile device with the notification, or to cause the mobile device to establish a data communication connection with the server.

Workaround methods, however, have evidenced inefficiencies on multiple fronts. By relying on SMS-type messaging, the workarounds require additional SMS-related hardware and software for operation. Notifications sent by SMS are subject to stringent limitations (e.g., SMS messages can be no longer than 140 ASCII characters). In cases in which the SMS notification causes the mobile device to establish a communication channel with the server, the mobile device, the associated subscriber account, and the requesting application need to be authenticated and/or validated each time a channel is established, requiring significant overhead in terms of network and communication resources. Server-initiated notifications are becoming more widespread, as mobile devices increasingly run multiple concurrent applications each requiring push notifications, and the increased usage of server-initiated notifications is straining network and communication resources as the number of mobile devices increases.

With the advent of push technology, a new modality is available to push messages to mobile devices. A push server can use a pull-based hypertext transfer protocol (HTTP) connection to push messages asynchronously, in real time to the mobile device. The source of push messages are enterprise applications and third party vendors, which together may be referred to as push sources. With the rapid growth in mobile push messaging services, a need exists for highly scalable communication systems able to keep pace with the growth in numbers of client devices using push messaging services, and with the bandwidth used by such client devices. Additionally, as users increasingly rely on push messaging services, push messaging systems should be highly available and provide reliable push messaging services at all times.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a series of block diagrams showing an example of a process for converting a backup push controller to function as a primary push controller.

DETAILED DESCRIPTION OF PREFERRED EMBODIMENTS

Figure 1A:
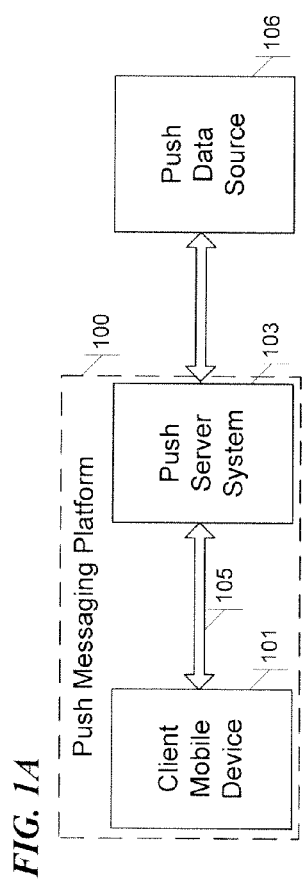
FIGS. 1A and 1B are block diagrams showing an example of a push messaging platform including a client mobile device and a push server system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The exemplary techniques and equipment discussed below provide push messaging platforms, and such exemplary technologies may offer high scalability and/or availability.

By way of a high-level example, a push messaging server system includes a load balancer, push engines (also referred to as front-end servers), and push controllers (also referred to as middle-end servers), for establishing and maintaining persistent connections with mobile devices, and for pushing messages containing data to the mobile devices through the persistent connections. The load balancer distributes new connection requests received from mobile devices across the push engines, so as to distribute the connection load across the push engines. Each push engine establishes and maintains a persistent connection, with a client on a mobile device, for each connection request received from a load balancer, and forwards the connection request to a push controller. Each push controller is associated with a number of mobile device identifiers. Each push controller runs a local registered process (LRP) for each mobile device having a persistent connection and having a device identifier which the push controller is associated with. Each LRP maintains for a respective mobile device a basic record which includes connection and session information for the client device's persistent connection. A mobile device establishes a persistent connection with the push messaging server system in order to receive push messaging services through a mobile communication network. An exemplary push messaging server system provides high scalability by providing an architecture in which load balancers, push engines, and/or push controllers can easily be added or removed, and in which the connection and processing loads can be dynamically distributed across the set of load balancers, push engines, and push controllers.

Reference now is made in detail to the examples illustrated in the accompanying drawings and discussed below. The various systems and methods disclosed herein generally relate to providing server-initiated "push" messaging platforms with high scalability and high availability.

A "push" messaging (i.e., data communication) platform is one in which a server can initiate the sending of data to a client device without waiting for a client request for the data. In a push messaging architecture, a client mobile device and a push messaging server system hold or maintain a persistent data connection between each other. When the push messaging server system has data to send to the client device, the push messaging server system transmits the data to the client device using the persistent data connection. The persistent connection enables the server system to communicate with a client application on the mobile device without having to set up a new connection every time a message is available for the client, thereby enabling the server system to transmit the message promptly (i.e., with minimal delay, in near real-time) and with minimal overhead in communications and processing. In general, the persistent connection is a logical connection through a mobile traffic network, such as a packet switched communication session through the network.

A push messaging server or server system may have limited communications and/or processing power. For example, a server or server system may have limited bandwidth, and/or may not be able to hold or serve more than a set number of communication connections. The server or server system may have limited processing power, and the server or server system's performance may be negatively affected if excessive demands are placed on the limited processing resources. As the demand for push messaging services increases, the quality of push messaging services provided by a push messaging server system having a fixed capacity may therefore deteriorate. In order to maintain push messaging service quality in the face of variable (and/or increasing) push messaging demand, a push messaging system having high scalability is presented. A scalable push messaging system has the capability to service increasingly large numbers and volumes of connection requests, for example by enabling additional push messaging servers to be added seamlessly to the push messaging server system. The scalable push messaging system may further have the ability to dynamically balance a connection load among the push messaging servers of the system, to support pushing large numbers of messages (e.g., millions of messages) to client mobile devices simultaneously through the push messaging servers of the system, and to manage acknowledgements effectively to track successful message delivery. The scalable push messaging system takes into consideration the processing capability of the multiple servers it relies on for operation, and effectively balances the push messaging load across the multiple servers.

The push messaging services provided by the push messaging system may further be prone to failures. Push messaging services may fail when any one of the servers of the push messaging system fails, when the communication network supporting the push messaging system fails, and/or when any other component part of the push messaging system fails. As a push messaging system relies on increasingly large numbers of servers for its operation, the probability of failure of the push messaging system increases. In order to maintain push messaging service in the face of failures of any component part of the push messaging system, a push messaging system having high availability is presented. To provide a functional and reliable push messaging system, a push platform with high availability includes mechanisms to recover from failure of any critical component. A critical component can include any of the interfaces with back-end, middle-end, and/or front-end servers. Failures could result in temporary or permanent unavailability of one or more servers, and/or the unavailability of a network or connection between the back-end, middle-end, and/or front-end servers. A push messaging server system with high availability can include mechanisms to recover from such failures without having to re-establish connections with the client mobile devices the system provides connections for.

FIG. 1A shows an example of a push messaging platform 100 including a client mobile device 101 and a push server system 103. The push messaging platform 100 provides push messaging services by establishing a persistent connection 105 (or persistent communication session) between the mobile device 101 and the server system 103. The push server system 103 is connected to a push data source 106 through a network data connection. The push server 103 can receive push data or other messaging data for the client mobile device 101 from the push data source 106. The persistent connection 105 enables the push server system 103 to initiate transmission of the push data or other data to a client application or module running on the client mobile device 101. The persistent connection 105 further enables the push server system 103 to send the push data to the client mobile device 101 with minimal delay, because the push server system 103 need not wait for a request from the client mobile device 101 to establish a connection and transmit the data to the client mobile device 101. While push messaging platform 100 illustratively shows a single client mobile device 101, a single push server system 103, a single persistent connection 105, and a connection to a single push data source 106, the platform 100 will typically include multiple client mobile devices, and multiple connections to multiple push data sources; and the platform 100 can include multiple push server systems and/or persistent connections to provide push messaging services to each of the client mobile devices.

Figure 1B:
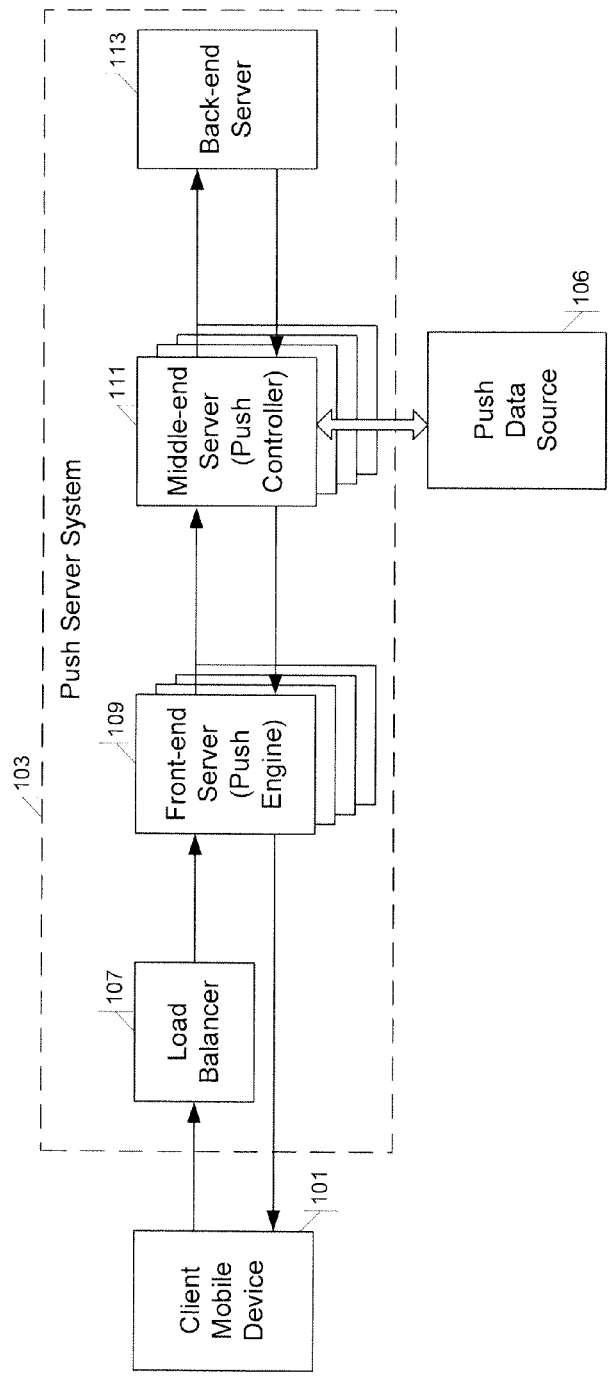

In order to provide reliable push messaging services, the push server system 103 can be designed to be highly scalable and highly available. FIG. 1B shows a more detailed view of the exemplary push messaging platform 100 of FIG. 1A, in which component parts of push server system 103 are shown. Push server system 103 includes one or more load balancers 107, front-end servers each configured as a push engine 109, middle-end servers each configured as a push controller 111, and back-end servers 113. While push server system 103 is illustratively shown to include one load balancer 107, multiple front-end servers configured as push engines 109, multiple middle-end servers configured as push controllers 111, and one back-end server 113, the system 103 can generally include different numbers of (including one or multiple) load balancer(s), front-end server(s)/push engine(s), middle-end server(s)/push controller(s), and back-end server(s) in communication with each other.

Load balancer 107 (also referred to as a load balancing appliance) is connected between client mobile device 101 and push engines 109. Load balancer 107 receives connection requests from one or more client mobile device(s) 101, and distributes the connection requests across the push engine(s) 109. In particular, for each received connection request, the load balancer 107 selects a push engine 109 to which the connection request should be forwarded, and transmits the connection request to the selected push engine 109. The load balancer 107 can select the push engine 109 based on the push engine's connection load (e.g., by selecting the push engine of a plurality of push engines having the fewest connections, or the fewest active connections), based on a round-robin selection (e.g., by sequentially selecting each push engine of the plurality), or based on any other appropriate algorithm or selection method.

The load balancer 107 is used to distribute the connection requests at least substantially evenly (balanced to a practical degree) across the one or more push engine(s) 109. As such, if one or more push engine(s) 109 are added to the push server system 103, the load balancer 107 distributes connection requests to the newly added push engines 109 as well as to the previously present push engines 109. Conversely, if one or more push engine(s) 109 are removed from the push server system 103 (or if one or more push engine(s) fail, crash, or otherwise go down or become unusable), the load balancer 107 distributes connection requests only to the remaining push engine(s) 109. While a single load balancer 107 is illustratively shown in FIG. 1B, two or more load balancers 107 may be used. In examples including multiple load balancers 107, a connection request from a client mobile device 101 may be routed to the load balancer 107 nearest the client mobile device, to a load balancer 107 associated with the client mobile device 101, to a load balancer 107 associated with a base station or base transceiver system transiting the connection request, or to another appropriately selected load balancer 107.

Push engine 109 (also referred to as a front-end server) is connected between the load balancer 107 and the push controller(s) 111. The push engine 109 is implemented on a front-end server, which is configured to function as the push engine 109. The push engine 109 is also connected to the client mobile device 101 indirectly, through load balancer 107, and optionally directly, through a direct link between push engine 109 and client mobile device 101. In general, push engine 109 holds (or maintains) a persistent connection with a client application or module on the client mobile device 101, for example by monitoring the connection and sending periodic heartbeat messages to the client mobile device 101 to monitor the connection status and keep the persistent connection active and alive. In order to establish the persistent connection, push engine 109 receives the connection request from the load balancer 107, and forwards the connection request to a push controller 111. The push engine 109 can forward the connection request as an authentication and/or registration request. The push engine 109 further forwards data messages and authentication/registration result messages received from the push controller 111 to the client on the mobile device 101. In general, a push engine 109 is associated with one or more particular connections (e.g., persistent connections), and communications between the client mobile device 101 and the push controller 111 that are associated with the one or more particular connections are routed through the push engine 109. In general, the push server system 103 includes multiple push engines 109, each push engine being associated with different sets of persistent connections. In one example, the association of a push engine 109 with one or more particular connections (e.g., persistent connections) may be performed by the load balancer 107 as new connection requests are received at the load balancer 107 from client mobile devices 101 and distributed to the push engines 109. In the example, the association of a push engine 109 with one or more particular connections may therefore be performed substantially randomly based on the algorithm or selection method used by the load balancer 107.

Push controller 111 (also referred to as a middle-end server) is connected between the push engine(s) 109 and the back-end server(s) 113. The push controller 111 is implemented on a middle-end server, which is configured to function as the push controller 111. In general, the push controller 111 maintains the client record (or client mobile device record) associated with a client mobile device 101, including records of the client mobile device's authentication status (i.e., client credentials) and of the persistent connection(s) and sessions associated with the client mobile device (and, optionally, of the push engine associated with each persistent connection).

The push controller 111 further routes messages or communications (e.g., connection requests, connection responses, data messages, or the like) between the push engine 109 and the back-end server 113, and from the push data source 106 to the push engine 109. For example, the push controller 111 forwards to the push engine 109 (specifically, to the particular push engine 109 associated with the persistent connection between the push engine 109 and the particular client mobile device 101) a communication (e.g., a connection or authentication response message) for a client mobile device 101 received from the back-end server 113 or push data source 106; or the push controller 111 forwards to the back-end server 113 a message (e.g., a connection or authentication request) from a client mobile device 101 received from the push engine 109. In order to establish the persistent connection, in particular, push controller 111 routes the client connection request received from a push engine 109 to the appropriate back-end server 113, and stores the client connection authentication received from the back-end server 113. The push controller 111 can additionally forward the client connection authentication message received from the back-end server 113 to the appropriate push engine 109.

In general, each push controller 111 is associated with one or more particular client mobile devices 101, and communications associated with the one or more particular devices 101 are routed through the corresponding push controller 111 between the push engine 109, the back-end server 113, and push data source 106. In one example, a push controller is associated with client mobile devices 101 having particular mobile directory numbers (MDNs). In general, the push server system 103 includes multiple push controllers 111, each push controller being associated with different sets of client mobile devices 101. However, in some examples, the push server system 103 can include a single push controller 111.

In general, a push engine 109 sends messages or communications associated with a client mobile device 101 to a first push controller 111 of the push server system 103. Similarly, a push data source 106 sends messages or communications associated with a client mobile device 101 to a first push controller 111 of the push server system 103. In general, the first push controller 111 is a random push controller 111 (e.g., a push controller randomly selected among a plurality of push controllers 111); however, the first push controller 111 can alternatively be a selected push controller which the push engine 109 or push data source 106 send messages or communications to (e.g., a push controller selected according to a round-robin selection, a push controller selected based on the identity of the push engine or push data source having sent a message or communication, or the like). In order to route (or transmit) the message or communication from the first push controller 111 to the particular push controller 111 associated with the client mobile device 101, each push controller 111 includes a dispatcher (not shown). The dispatcher is configured to transmit a message or communication received by one push controller 111 to the particular push controller 111 associated with the client mobile device 101 identified by the message or communication. For example, if the first push controller 111 receives a message or communication associated with a particular client mobile device 101, and if a second push controller 111 is itself associated with the particular client mobile device 101, the dispatcher of the first push controller 111 will identify the second push controller 111 and forward the message or communication to the second push controller 111 without the first push controller 111 forwarding the message or communication to the particular client mobile device 101. The dispatcher of each push controller 111 thus balances the processing load among the push controllers 111, by sending to respective push controllers 111 the messages and communications corresponding to each push controller 111.

Back-end server 113 can include one or more back-end server(s) 113, such as an authentication server. A back-end server 113 such as an authentication server may process authentication and registration requests originating from client mobile devices 101 and received from corresponding push controllers 111, and may feed authentication response to the corresponding push controllers 111. In one example, a back-end server 113 may receive a connection, authentication, and/or registration request from a client mobile device 101 (via load balancer 107, push engine 109, and push controller(s) 111), perform authentication and/or registration in response to the received request, and send a request response message to the push controller 111 indicating whether or not the connection, authentication, and/or registration request was granted. The back-end server 113 generally sends the response message to the particular push controller 111 from which the connection, authentication, and/or registration request was received. As a result, the response message from the back-end server 113 is generally received at the particular push controller 111 associated with the client device, and the response message does not generally need to be forwarded by a dispatcher to another push controller 111.

Push data source 106 can include one or more server(s) that provide push data, messages, and other communications to the push server system 103 for transmission to one or more client mobile devices 101. In one example, a push data source 106 may be an application server or a data server configured to provide weather, traffic, or other push data or messages to particular client mobile devices 101. The push data or messages may be provided for a particular client mobile device 101 based on a subscription or account of a user of the client mobile device 101 with the push data source 106. The push data source 106 may be a server of a carrier network provider, but is more generally a third-party server communicating with the push server system 103 through a public network.

Using the push messaging platform and framework shown in FIGS. 1A and 1B, a client mobile device 101 can authenticate and register itself with the push server system 103, in order to establish a persistent connection with the push engine 109.

The component parts of push server system 103 (e.g., load balancer 107, push engine 109, push controller 111, and/or back-end server 113) are designed to distribute the connection, processing, authentication, and communication loads involved in providing push messaging services across a substantial number of servers, in order to improve system scalability and availability. The load balancer(s) 107, push engine(s) 109, push controller(s) 111. and back-end server(s) 113 are designed both to provide back-up capabilities, so as to maintain push messaging services between client mobile devices 101 and push data sources 106 even if one or more components of push server system 103 fail, and to provide scalability, so as to readily accommodate higher (or lower) traffic and processing loads by seamlessly adding additional (or removing underused) servers, connections, or other component parts as needed.

In order to improve the availability and reliability of the push messaging platform, the push server system 103 additionally uses linked processes, backup components, and site mirroring to provide automatic fault-tolerance in the event of component-specific or system-wide outage or failure.

Linked processes can be general-purpose, concurrent, garbage-collected processes such as processes implemented using the Erlang programming language and runtime system. Linked processes running on different processors, servers, or systems, can be linked together to monitor each other's status. The linked processes run concurrently, and in some examples the linked processes can be configured such that if a first linked process fails (e.g., if the process goes down, is interrupted, or the like), a second process that is linked to the first linked process immediately takes over the function of the failed first linked process. In other examples, the linked processes can be configured such that if the first linked process running on a first processor fails, the second process that is linked to the first linked process immediately recreates a peer process on the first processor. The linked processes may be Erlang processes, linked together using Erlang links. Alternatively or additionally, other types of linked processes can be used to provide fault-tolerance.

A supervisor process can be used to monitor two or more processes, and to determine whether each of the monitored processes is functioning properly. The supervisor process can monitor two or more linked processes that are linked to each other, so as to determine whether any one of the linked processes has failed. The supervisor process can further be configured to send out a notification when a monitored process fails, such as a notification to notify a first process linked to a second process that the second process is determined to have failed. In one example, an Erlang supervisor process is used to perform monitoring of processes. In other examples, other types of supervisor processes can be used.

Figure 2:
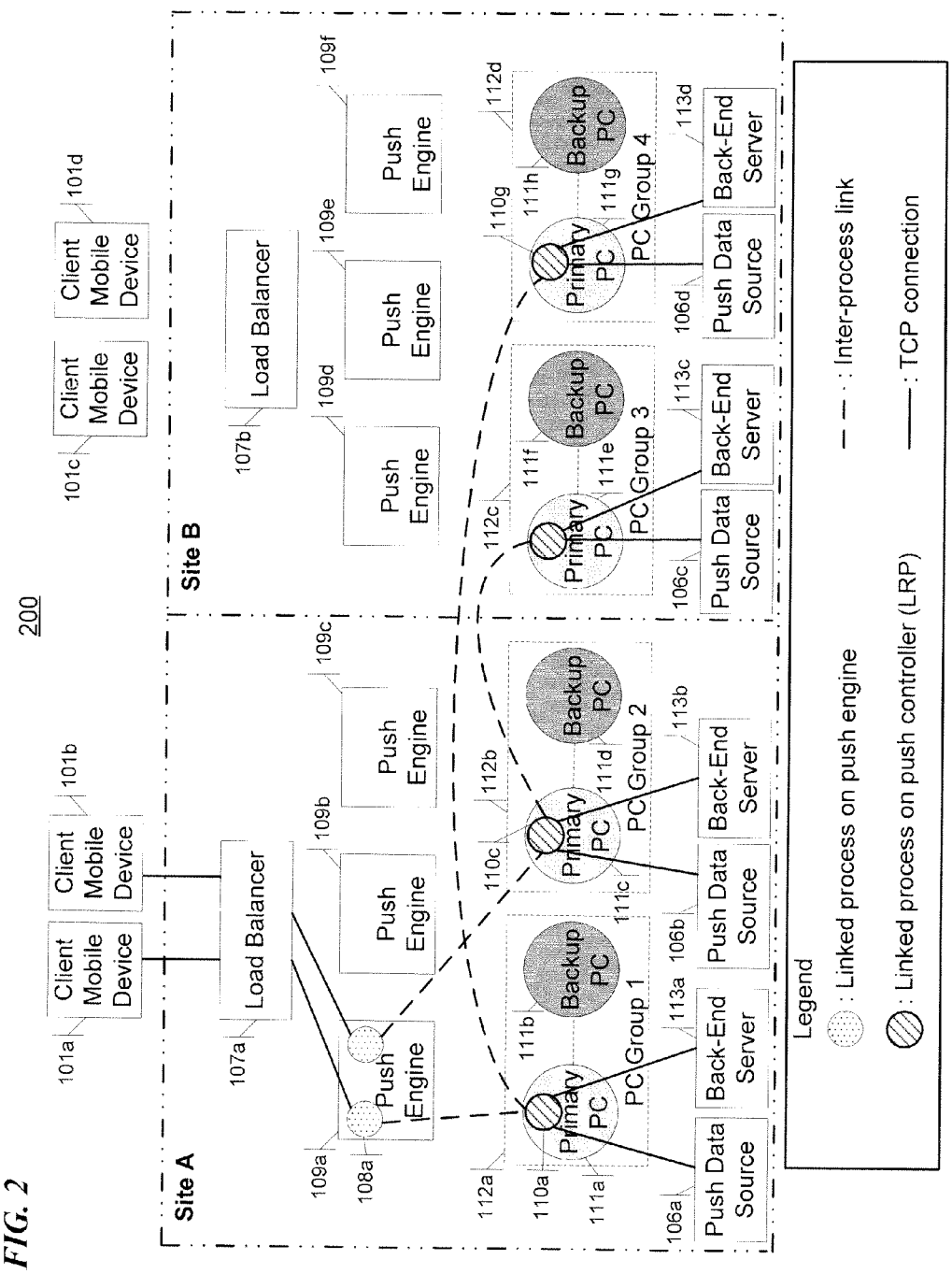
FIG. 2 is a network diagram showing an example of a push messaging platform network architecture.

FIG. 2 shows an example of a push messaging platform 200 including linked processes, backup components, and cross-site mirroring to provide improved platform availability. Several of the elements shown in FIG. 2 have been previously described in relation to FIGS. 1A and 1B, and reference can be made to the description of the elements included previously.

Push messaging platform 200 includes a plurality of client mobile devices 101*a-d*; a plurality of load balancers 107*a-b*; a plurality of push engines 109*a-f*; a plurality of push controllers (PCs) 111*a-h*; and a plurality of back-end servers 113*a-d*. The push messaging platform 200 may further be in communication with one or more push data sources 106*a-d*.

The components of push messaging platform 200 are distributed across two or more sites, e.g. Site A and Site B. In general, the sites are physically or geographically separate sites, and may have connections to different sections of (or to different) carrier networks. In one example, a first site is associated with an Eastern portion of a carrier network, and the site is physically located in the Eastern portion, while a second site is associated with a Western portion of a carrier network and is physically located in the Western portion. The separate sites can be used to provide reliable push messaging services even if the push messaging platform, the network, or other component suffer a failure in one (or all but one) of the sites.

Some (but not all) connections between components of the messaging platform are illustratively shown in FIG. 2. For example, connections (e.g., TCP connections) are shown between load balancer 107a and client mobile devices 101a and 101b, and between load balancer 107a and push engine 109a. In general, additional connections also exist, and/or additional connections could be established, through a communication network linking the mobile devices 101, load balancers 107, and servers 109, 111, and 113, shown in FIG. 2. For example, additional connections may be present between each client mobile device 101a-d and each load balancer 107a-b, between each load balancer 107a (or 107b) and each push engine of the same site 109a-c (or 109d-f), between each push engine 109a-f and each client mobile device of the same site 101a-d, between each push engine 109a-c (or 109d-f) and each push controller of the same site 111a-d (or 111e-h), between each push controller 111a-d (or 111e-h) and each back-end server of the same site 113a-b (or 113c-d), and/or between each push controller 111a-h and each push data source 106a-d. Additional connections, however, may additionally enable client mobile devices and push server system components to connect across sites. For example, each client mobile device 101a, 101b of Site A may be able to connect to load balancer 107b and/or push engines 109d-f of Site B.

As shown in FIG. 2, a client mobile device 101a establishes a connection (such as a TCP connection) to the load balancer 107a. The connection may be used to transmit a connection request message from the client mobile device 101a to establish a persistent connection for push messaging for the client mobile device 101a, for example. The connection request can include an identifier for the client mobile device (e.g., a mobile directory or device number (MDN), a mobile identification number (MIN), or the like). The connection request is generally sent from the client mobile device 101a to a push engine 109a-f, and is automatically routed through a load balancer (such as load balancer 107a) which determines which one of the push engines 109a-f the request should be forwarded to. In general, the connection request may be addressed to any push engine 109, and the load balancer 107a identifies one of the push engines 109a-c of the same site (e.g., Site A) for forwarding the request.

The load balancer 107a establishes a connection (such as a TCP connection) to one or more of the push engines 109a-c, for example. The connection can be established in response to receiving the connection request message from the load balancer 101a, and determining which one of the push engines 109a-c the connection request message should be forwarded to. The load balancer 107a forwards the connection request to the determined push engine 109a-c over the established connection.

The determined push engine (e.g., push engine 109a) receives the connection request including the identifier for the client mobile device 101a, and generates a linked process 108a on the push engine 109a. The linked process 108a is unique, and is associated with the particular connection created using the connection request between the push engine 109a and the client mobile device 101a. The linked process 108a stores connection information including the identifier for the client mobile device 101a and an identifier for the load balancer 107a having routed the connection request to the push engine 109a. The linked process 108a can also hold the connection open by monitoring the status of the connection, for example by sending periodic heartbeat messages to the client mobile device 101a through the persistent connection. Upon receiving the connection request, the push engine 109a also forwards the connection request to a push controller 111.

In general, the connection request is forwarded by the push engine 109a to any of the push controllers 111a-111d of the same site as the push engine 109a (or, alternatively, to any of the push controllers 111a-111h). A random one of the push controllers 111a-111d (or, alternatively, 111a-111h) receives the connection request. Upon receiving the connection request, the random push controller 111 provides the request to a dispatcher of the push controller 111, and the dispatcher identifies the particular push controller that the request should be forwarded to based on the identifier for the client mobile device included in the request. In the case illustrated in FIG. 2, the connection request is determined to include an identifier for client mobile device 101a, and the connection request is provided to push controller 111a which is associated with the identifier for client mobile device 101a.

Push controller 111a receives the connection request, and generates a linked process 110a on the push controller 111a. The linked process 110a is unique, and is associated with the particular client mobile device 101a identified in and associated with the connection request. The linked process 110a can be referred to as a local registered process (LRP). The linked process 110a handles the client mobile device's 101a connection request, and stores information related to the connection request and to the connection to the client mobile device 101a. In general, the linked process 110a can be named with the identifier (e.g., MDN, or the like) of the client mobile device 101a it is associated with, and can maintain and update a record storing the information related to the connection request and to the connection to the client mobile device. In particular, the record can include a push engine process identifier (PID) for identifying the linked process 108a on the push engine 109a that handles the connection between client device 101a and push engine 109a; a session identifier (session ID) granted to that client device 101a by an authentication server (such as back-end server 113a); an application identifier set (App ID Set) including a list of identifiers of applications registered for the client device; a session ID Time-To-Live storing the remaining time before the session ID becomes invalid; and a device identifier (Push ID), such as a MDN, identifying the client mobile device the process is associated with.

The linked process 110a is linked to (or associated with) the linked process 108a generated in the push engine 109a and associated with the connection request. In general, the processes 108a and 110a are linked such that process 110a can monitor the up/down status of the push engine process 108a, and can take remedial action if push engine process 108a is determined to have failed or have gone down. Process 108a may also monitor the status of push controller process 110a, and take remedial action if the push controller process 110a is determined to have failed or have gone down. In addition to monitoring each other, the processes 108a and 110a can monitor the connection between each other, to take remedial action if the connection is lost. In one exemplary embodiment, push engine 109a is a Mochiweb-based Erlang server; process 108a is a unique Erlang process; push controller 111a is also an Erlang server or system; process 110a is an Erlang process; and an Erlang link is established between the push engine process 108a and the push controller process 110a to monitor the up/down status of the push engine process 110a. In another exemplary embodiment, a supervisory process is established to monitor the status of the push engine and push controller processes 108a and 110a, and to take remedial action if either process or the link therebetween experience failure.

In addition to establishing the linked process 110a in response to receiving the connection request, the push controller 111a may need to authenticate the client mobile device 101a identified in the connection request. In order to authenticate the client mobile device 101a, the push controller 111a establishes a connection (such as a TCP connection) to an authentication server, such as one or more of back-end servers 113a-d. Once the connection is established with one of the back-end servers 113a-d, the push controller 111a or the linked process 110a sends an authentication request to the back-end server having the connection established (e.g., back-end server 113a). The back-end server 113a performs authentication, for example by verifying that one or more identifiers or other credentials for the client mobile device 101a included in the authentication request are valid. The back-end server 113a then sends a notification of the result of the authentication to the push controller 111a (or to the process 110a). In general, the back-end server 113a sends the notification of the result to the particular push controller 111a (or process 110a) that sent the authentication request to the back-end server 113a. The authentication result message may be forwarded by the push controller 111a to the push engine 109a running the linked process 108a associated with the persistent connection to the client device identified in the authentication request and authentication result messages. If the authentication is successful and indicates the client mobile device 101a is authenticated, the connection established between the client mobile device 101a and the push engine 109a is held as a persistent connection. If the authentication is successful, the back-end server 113a may send to the push controller 111a (or to the process 110a) a session identifier (session ID), a Time-to-Live, and/or other connection session information for the authenticated session. The Time-to-Live information is an indicator for a time or time-period during which the session identifier will remain valid, and may include an indicator for a length of time (e.g., 48 hours from a current time), an expiry date or time (e.g., 11:59 pm on the following day), or the like. If the authentication indicates the client mobile device 101a is not authenticated, the connection is terminated.

Once a successful authentication is completed, the persistent connection can be used to push data or messages to the client mobile device 101a. For example, a push data source 106a may have data to send to (or push to) a particular destination client mobile device 101a. The push data source 106a sends the push data to a random push controller (e.g., push controller 111a), and identifies the destination client mobile device 101a. The random push controller (e.g., 111a) receives the push data from the push data source 106a, and retrieves an identifier for the destination client mobile device 101a from the push data. The dispatcher of the random push controller (e.g., 111a) identifies the particular push controller 111a associated with the identifier, and forwards the push data to the identified push controller 111a. In turn, the identified push controller 111a retrieves, from the LRP 110a associated with the destination client mobile device 101a, the connection details associated with the client mobile device 101a including an identifier for the push engine 109a, linked process 108a, and/or persistent connection associated with the client device 101a. Based on the retrieved connection details, the identified push controller 111a forwards the push data to the push engine 109a and linked process 108a holding the persistent connection with the client mobile device 101a identified in the push data. Finally, upon receiving the push data from the push controller 111a, the push engine 109a forwards the push data to the destination client mobile device 101a using the persistent connection to the destination client mobile device 101a.

To further increase the availability and reliability of the push controller 111a, backup mechanisms, such as the backing up of the push controller and site mirroring, can be used alternatively or in combination.

First, each push controller 111 (i.e., a primary push controller) can be provided with a backup push controller, such that each primary push controller and associated backup push controller form a push controller group 112. For example, primary push controller 111a has a backup controller 111b, and is part of a first push controller group (PC Group 1) 112a. The primary and backup push controllers 111a, 111b run linked processes and/or each run a supervisory process which monitors each push controller's operation. The linked processes that are linked between the primary and backup push controllers 111a, 111b can be referred to as global registered processes (GRPs). If the primary push controller 111a goes down or becomes unavailable, the linked processes and/or the supervisory process cause the backup push controller 111b to take over the operation of the primary push controller 111a. As such, the push controller group 112a provides continued and seamless operation even if one of the primary 111a and backup 111b controllers go down.

Second, each push controller (and/or push controller group) in each Site can have a designated mirror push controller (and/or push controller group) in another Site. Push controller 111a at Site A may be associated with a corresponding push controller 111g at Site B, each of the push controllers serving as a back-up mirror controller to each other. For example, push controller 111a can create a mirror process 110g to the local registered progress 110a by making a remote call to the remote push controller 111g. The mirror push controller 111g can be configured to take over the functioning of its associated push controller 111a in the event of a failure. In particular, a linked process 110a on push controller 111a can be linked to (or associated with) a mirror linked process 110g running on the mirror push controller 111g. The mirror linked process 110g can store part of, or all of the data associated with linked process 110a. The primary and mirror linked processes run linked processes. For example, if the primary linked process 110a goes down or becomes unavailable, the mirror linked process 110g takes over the operation of the primary linked process 110a. Requests destined for the primary push controller 111a are automatically routed to the mirror controller 111g when controller 111a is not available. As such, the mirror push controller 111g provides continued and seamless push controller operation even if both the primary 111a and backup 111b push controllers go down. In addition, the mirror push controller 111g can provide continued and seamless operation even if a network outage at Site A, an outage of push server hardware or push server system at Site A, or other widespread outage at Site A, causes the push server system 103 at Site A to stop functioning.

Figure 3A:
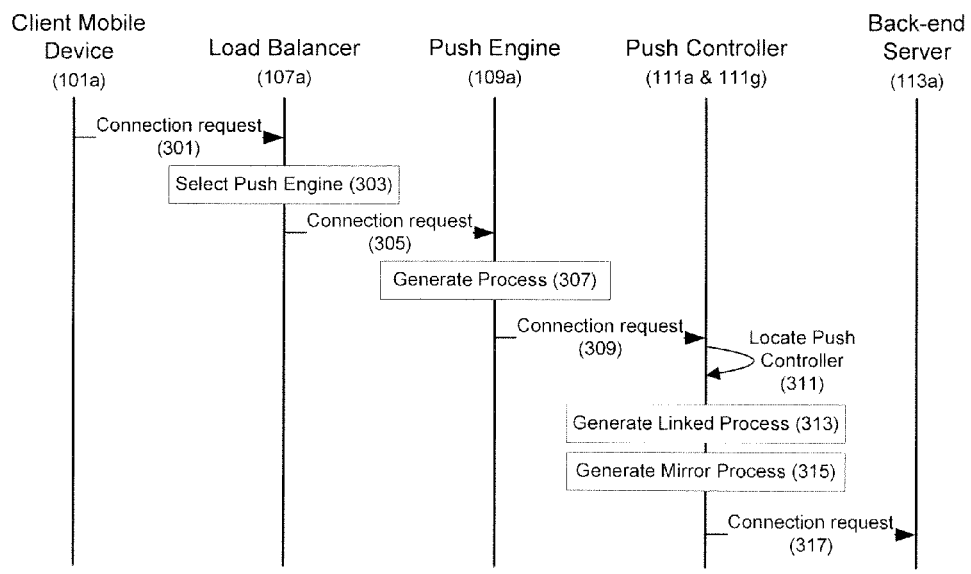
FIGS. 3A and 3B are signal timing diagrams showing examples of signal flows involved in establishing persistent connections for client mobile devices with push server systems.
Figure 3B:
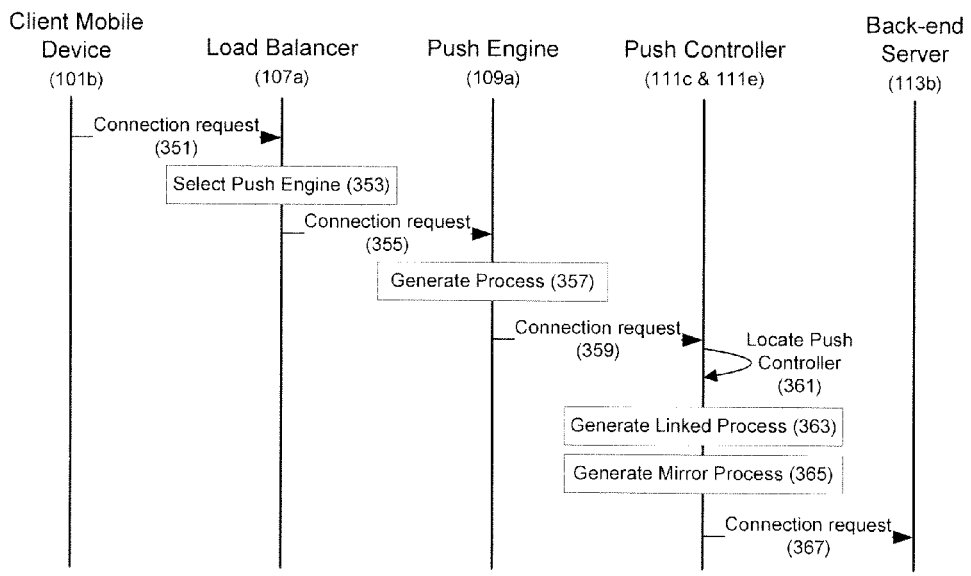

FIGS. 3A and 3B are signal timing diagrams showing example signal flows involved in establishing a persistent connection for two exemplary client mobile devices. FIG. 3A focuses on the flow for creating a persistent connection for client mobile device 101a, while FIG. 3B shows the flow for creating a persistent connection for client mobile device 101b.

In FIG. 3A, client mobile device 101a generates and sends a connection request, including an identifier for the client mobile device (step 301). The connection request is routed through a load balancer 107a, which selects or identifies a push engine to which the connection request should be forwarded (step 303). In general, the push engine may be selected so as to distribute new connection requests received from mobile devices substantially evenly across the push engines. The load balancer 107a forwards the connection request to the selected push engine 109a (step 305). The push engine 109a generates a linked process 108a to hold the connection to the client mobile device 101a (step 307), and transmits the connection request (and/or an authentication or registration request) to a push controller (step 309). A random push controller (e.g., push controller 111a) receives the connection request, and a dispatcher of the random push controller identifies or locates the push controller 111a associated with the client mobile device 101a (or with the identifier for the client mobile device included in the connection request), and forwards the connection request to the identified push controller 111a (step 311). In response to receiving the connection request, the identified push controller 111a generates a linked process 110a which is linked to process 108a (step 313). The push controller 111a further causes a mirror process 110g to be generated in a mirror push controller 111g to push controller 111a (step 315). Finally, push controller 111a sends the connection request (and/or an authentication or registration request) to the back-end server 113a to authenticate the client mobile device 101a (step 317).

FIG. 3B shows a similar process to that shown in FIG. 3A, but relating to a connection request from client mobile device 101b. Steps 351-359 are substantially similar to step 301-309, and reference can be made to the description of steps 301-309. In step 361, however, a random push controller receives the connection request, and a dispatcher of the random push controller identifies or locates the push controller 111c associated with the client mobile device 101b (or with the identifier for the client mobile device included in the connection request), and forwards the connection request to the identified push controller 111c. Push controller 111c then generates a local linked process on push controller 111c (step 363), which is linked with a linked process associated with the connection request on push engine 109a and is linked with a mirror linked process on mirror push controller 111e (step 365). The connection authentication request is sent to the back-end server 113b in step 367.

Figure 4A:
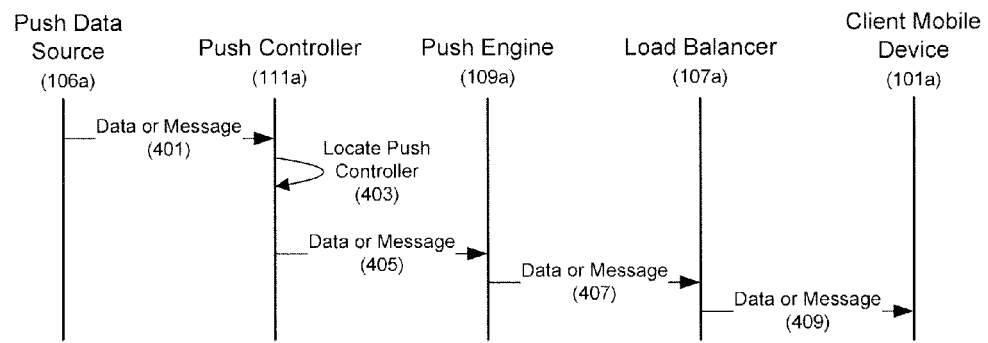
FIGS. 4A, 4B, and 4C are signal timing diagrams showing examples of signal flows involved in a push server system sending data or a message to a client mobile device.
Figure 4B:
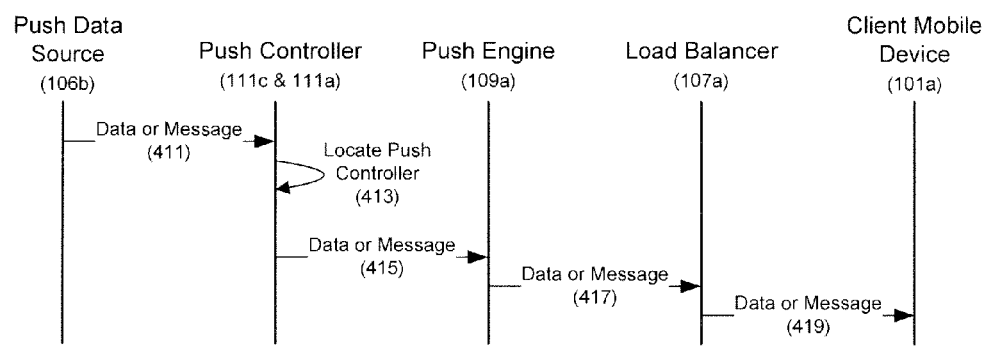
Figure 4C:
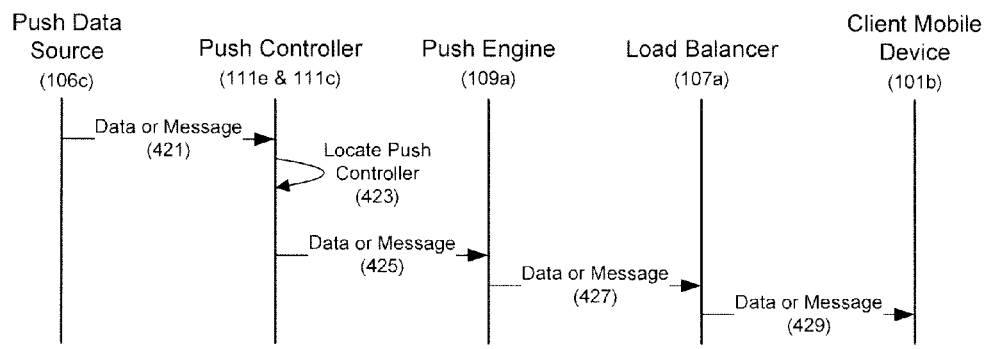

Once the persistent connection between client mobile devices 101a, 101b and push server system 103 is established and authenticated, the push messaging system can use the persistent connection to send push messages and push data (such as push data received from push data source 106) to client mobile devices 101a and 101b. FIGS. 4A-4C are signal flow diagrams showing examples of signaling involved in the push messaging platform 200 sending data or message to client mobile devices 101a and 101b.

In FIG. 4A, push data source 106a sends data or a message to a random push controller (e.g., a random local push controller, such as push controller 111a), the data or message including a destination identifier (e.g., an MDN, MIN, or the like) for client mobile device 101a (step 401). The random push controller 111a receives the data or message, and a dispatcher of the random push controller 111a identifies or locates the particular push controller associated with the client mobile device 101a (or with the identifier for the client mobile device included with the data or message) and running the linked process 110a associated with the client mobile device 101a, and forwards the data or message to the identified particular push controller (step 403). In this exemplary case, the identified push controller/linked process may be push controller 111a running linked process 110a. In response to receiving the message or data, the linked process 110a associated with the client mobile device 101a and running on push controller 111a retrieves connection information associated with the client mobile device 101a identified in the data or message. Based on the retrieved connection information, the linked process 110a identifies the linked process 108a running on push engine 109a associated with the client mobile device 101a, and forwards the message or data to the linked process 108a (step 405). The linked process 108a then forwards the data or message to the client mobile device 101a using the persistent connection the linked process 108a holds with the client mobile device 101a. The linked process 108a may forward the data or message to the client mobile device 101a either directly or indirectly (as shown) through the load balancer 107a in steps 407 and 409.

FIG. 4B shows a similar process in which push data source 106b sends data or a message to a random push controller (e.g., push controller 111c), the data or message including a destination identifier for client mobile device 101a (step 411). The random push controller 111c receives the data or message, and a dispatcher of the random push controller 111c identifies or locates the particular push controller 111a associated with the client mobile device 101a (or with the identifier for the client mobile device included with the data or message), and forwards the data or message to the identified particular push controller 111a (step 403). In response to receiving the message or data, the push controller 111a, linked process 110a, push engine 109a, linked process 108a, load balancer 107a, and client mobile device 101a perform steps 415-419 which are substantially similar to steps 405-409 described previously.

FIG. 4C shows a similar process in which push data source 106c sends data or a message to a random push controller (e.g., push controller 111e), the data or message including a destination identifier for client mobile device 101b (step 421). The push data source 106c sends the data or message to a random push controller 111e located at a Site B different from the Site A having the destination client mobile device 101b and the linked processes associated with the client mobile device 101b. The random push controller 111e receives the data or message, and a dispatcher of the random push controller 111e identifies or locates the particular push controller that is located at Site B (i.e., the same site as the random push controller 111e) and is associated with the client mobile device 101b (or with the identifier for the client mobile device included with the data or message), and forwards the data or message to the identified particular push controller (step 423). In this exemplary case, the identified push controller located at the same Site B may be push controller 111e, which runs the mirror linked process associated with client mobile device 101b. In response to receiving the message or data, the mirror linked process at push controller 111e may forward the message or data to the linked process at push controller 111c that it is a mirror process to. In turn, the linked process at push controller 111c can forward the message or data to the linked process associated with mobile client device 101b at push engine 109a (step 425). The linked process running on push engine 109a and associated with client mobile device 101b then forwards the message or data to client mobile device 101b in steps 427 and 429.

As described above in relation to FIG. 2, push controllers 110 can be organized in push controller groups 112. The push controller groups 112 are used to provide high scalability and high availability to the middle-end server which is configured as a plurality of pairs of push controllers. Each push controller group 112 generally includes a primary push controller (e.g., push controller 111a), and at least one backup push controller (e.g., push controller 111b). The primary and backup push controllers may be substantially identical push controllers that respectively function as primary and secondary push controllers. In general, all push controllers are allocated to push controller groups such that each primary push controller has at least one associated backup controller. The forming of push controller groups, and the use of linked processes or a supervisory process in each group to monitor the activity of the push controllers in the group, provides failover protection for push controllers within the group. The cross-monitoring of push controllers within a group reduces the overhead in managing of failover among large numbers of push controllers. Further, the linking of processes on primary and backup push controllers results in only one push controller within a group needing to be updated when a client connection is established with the push controller via a push engine. While the push controller groups shown in FIG. 2 each include two push controllers (specifically, a primary push controller and a backup push controller), the size of the push controller group can be reduced or expanded. For example, a push controller 111 associated with client mobile devices 101 requiring high reliability, such as critical client mobile devices 101 used by emergency responders, by corporate customers, or the like, may be provided with two or more backup push controllers to provide for higher reliability push messaging services. In another example, a push controller 111 associated with client mobile devices 101 not requiring high service reliability may be provided with one or no backup push controllers.

FIG. 5 illustratively shows a process for converting a backup push controller to function as a primary push controller in response to a failure in the primary push controller. The primary and backup push controllers thus form a push controller group 512, in which the backup push controller 511b provides redundancy for the primary push controller 511a, and in which each of the push controllers has the full functioning capabilities of a middle-end server configured as a push controller. In each push controller group 512, one of the push controllers 511a generates and runs a process 510a referred to as a global registered process (GRP). The GRP is a linked or supervisory process that performs the function of transiting messages through the push controller between a back-end server or a push data source and a push engine. The GRP also creates the LRP processes. The GRP process is linked to a process 510b referred to as a backup process which is generated and runs on another push controller 511b of the group 512. In one example, the GRP and backup process run over an Erlang virtual machine. In general, the push controller 511a running the GRP is referred to as the primary push controller, while the push controller 511b running the backup process is referred to as the backup push controller.

The push controller group 512 provides failover protection for the GRP using the linked processes 510a and 510b, which provide redundant functionality. In particular, under normal operating conditions, the GRP process 510a and its backup process 510b monitor each other, and each verify that the other process is running normally (step t0). If the GRP process 510a fails, is interrupted, or otherwise goes down (step t1), the backup process 510b detects that the GRP process 510a has gone down. In response to the detection, the backup process 510b converts itself to a GRP process (step t2), and takes over from the failed GRP 510a the functionality of the GRP for the push controller group 512. Hence, at step t2, the process 510b functions as the GRP. The process 510b also sends a remote call to the grouped push controller 511a to request that the grouped push controller 511a generate a new backup process. At step t3, the push controller 511a generates and runs a process 510a that functions as the backup process, while push controller 511b now runs the process 510b functioning as the GRP for the group 512. As such, while the process 510a running on push controller 511a receives and processes messages received from a back-end server at step t0, the process 510b on push controller 511b receives and processes messages received from the back-end server at step t3.

In addition to using backup push controllers, the push server system includes a plurality of push controllers (and a plurality of push controller groups) providing additional processing and connection capacity to the server system. In particular, if the push controllers of the push server system cannot handle a traffic load, the capacity of the push server system can be readily increased by adding more push controllers into the push server system. The added push controllers can be assigned to (or form) new push controller groups. In order to direct communications (e.g., connection requests, data, messages, or the like) to appropriate push controllers, the push controllers can each include a dispatcher.

Figure 6:
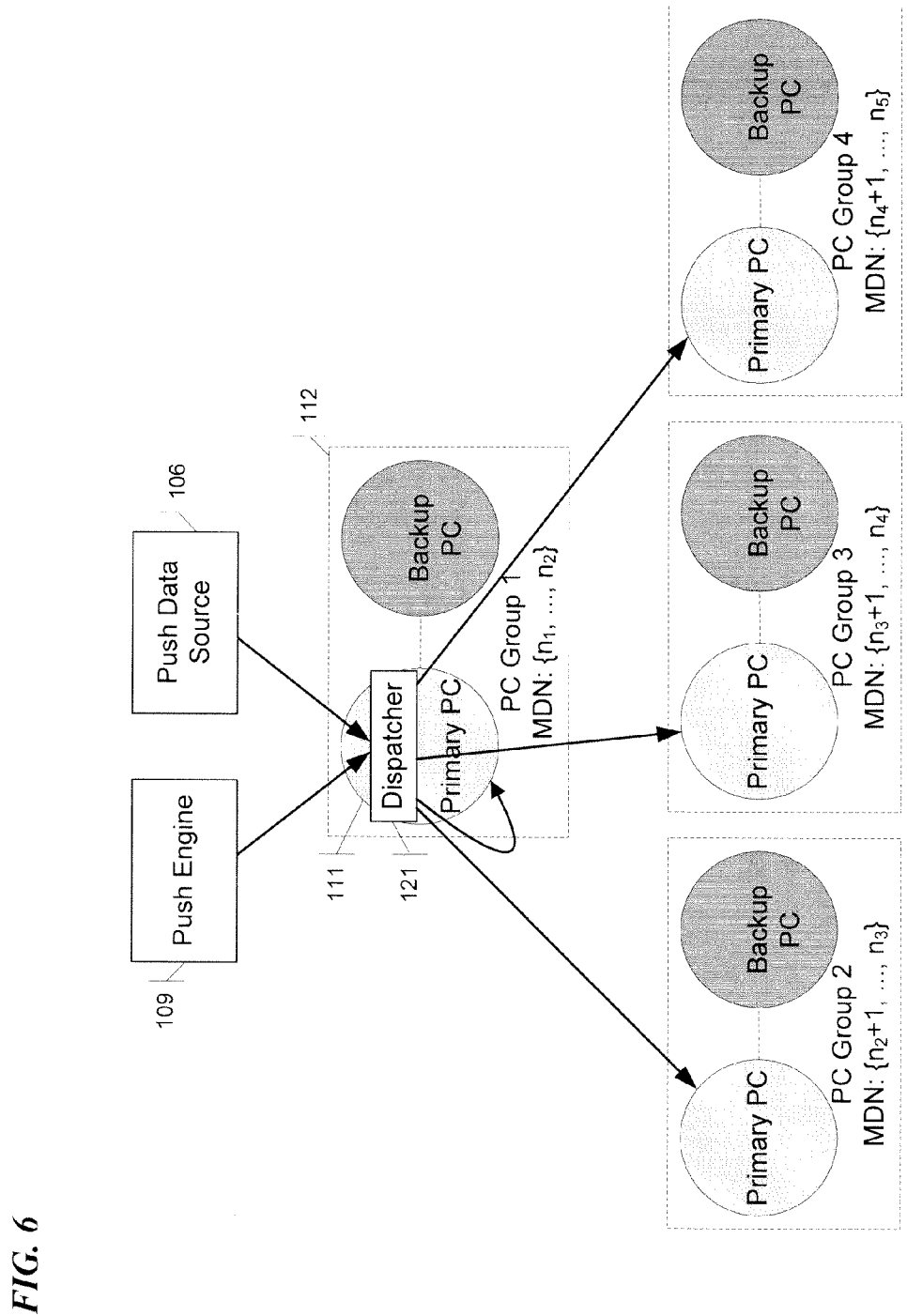
FIG. 6 is a block diagram showing an example of a push controller having a dispatcher.

FIG. 6 shows an exemplary push controller 111 having a dispatcher 121 for identifying a push controller to which a communication should be directed, and for directing the communication to the identified push controller. While only push controller 111 is shown as including a dispatcher in FIG. 6, in general each push controller includes a dispatcher. When a communication is sent from a push engine 109 or a push data source 106 to a push controller 111, the communication is received by a randomly selected push controller. In general, communications received from push engines 109 or push data sources 106 are distributed equally among the different push controllers (or push controller groups), so as to provide a uniform connection and processing load across the push controllers.

When a push controller (e.g., push controller 111) receives the communication, the dispatcher 121 of the push controller 111 captures the communication and dispatches the communication to another push controller or to its own push controller according to an identifier for a client mobile device (e.g., MDN, MIN, or the like) in the communication. In response to receiving the communication, the push controller 111 may send out a paging request including the identifier for the client mobile device to all of the push controllers, may wait for a response from one push controller associated with the identifier, and may dispatch or forward the communication to the one push controller having responded. The push controller 111 may store the communication in a temporary memory during the sending of the paging request, the waiting for a response, and the dispatching or forwarding of the communication to the one push controller. The push controller may remove the communication from the temporary memory once the push controller 111 receives a confirmation that the communication has been received by the one push controller.

In general, each client mobile device 101 is associated with a particular push controller 111, and each client mobile device 101 of a plurality of client mobile devices can be associated with a corresponding push controller 111 of a plurality of push controllers so as to distribute the processing load of the plurality of client mobile devices at least substantially evenly (balanced to a practical degree) across the plurality of push controllers. The substantially even distribution of the processing load may be performed based on an assumption that each mobile device receives a similar amount of push messaging traffic as each of the other mobile devices; based on a measurement of a current processing load on each push controller 111; based on an average processing load on each push controller 111 over a period of time; or based on other appropriate measures or assumptions. In general, each client mobile device 101 can be associated with a particular push controller 111 before any connection request is received from the client mobile device 101 in the push server system 103. However, each client mobile device 101 may alternatively only be associated with a particular push controller 111 when a connection request is received from the client mobile device 101 in the push server system 103.

In one example, each push controller (or push controller group) is associated with a set of client mobile devices (or client mobile device identifiers). In the example shown in FIG. 6, each group of push controllers is associated with a set of MDNs, such that first, second, third and fourth groups are respectively associated with MDNs from the groups $\{n_1, \ldots, n_2\}$, $\{n_2+1, \ldots, n_3\}$, $\{n_3+1, \ldots, n_4\}$, and $\{n_4+1, \ldots, n_5\}$. In another example, a different association between client mobile devices and push controllers (or push controller groups) may alternatively be used. Furthermore, the size or composition of the groups of client mobile devices associated with different push controllers can be adjusted in order to reduce or increase the connection and processing load on any push controller by re-associating certain client mobile devices with different push controllers. The association of client mobile devices to push controllers can also be altered to distribute the connection or processing load across a larger (or smaller) number of push controllers, for example by associating with a newly added push controller a client mobile device previously associated with another push controller. The dispatcher thus enables the push server system to readily add additional push controllers, or alternatively to remove excess push controllers, depending on the system capacity required to process client module devices' requests.

Figure 7:
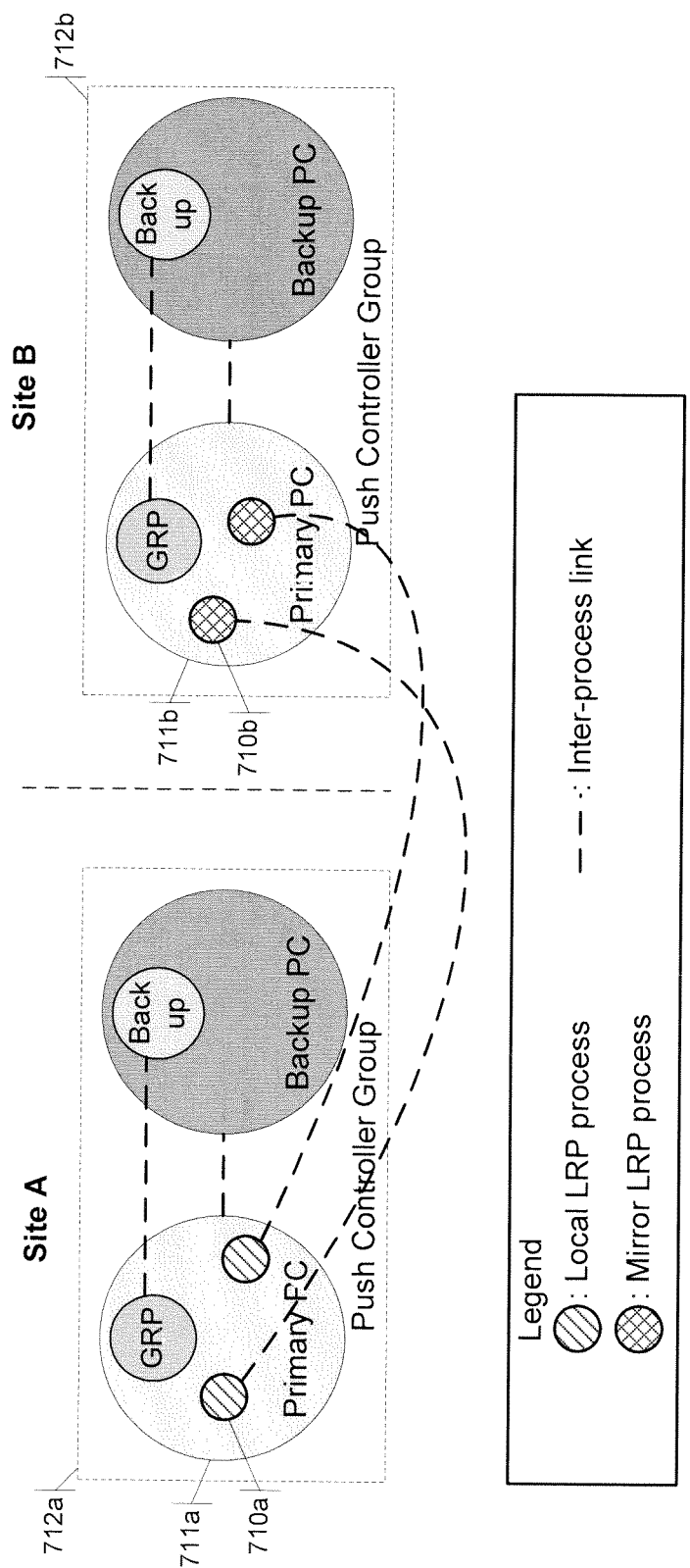
FIG. 7 is a block diagram showing an example of cross-site redundancy provided by push controllers in a push server system.

In order to provide further reliability, the push server system includes cross-site redundancies. The cross-site redundancy can be used to provide push server system availability from a mirror site (e.g., Site B) even if a network outage or other failure causes the server system in a first site (e.g., Site A) to fail. FIG. 7 illustratively shows the cross-site redundancy provided as part of the push server system. A push controller group 712a at a first site (e.g., a local site such as Site A) has a primary push controller 711a running a linked process 710a such as a LRP. In order to provide cross-site redundancy, the push controller 711a creates a mirror process 710b on a mirror push controller 711b at a site remote from the first site (e.g., Site B). The mirror process 710b corresponds to the local process 710a that is created at the local site. Each process 710a, 710b can be an LRP.

In general, when a push engine sends a connection request including a client mobile device's information to a push controller 711a, the push controller 711a generates a new local process 710a such as a LRP process. The local process 710a can make a call to the mirror push controller 711b located at a remote site to create a mirror process 710b. The local process 710a and the mirror process 710b establish an inter-process link (such as a logical link over an Erlang system) so as to monitor the up/down status change of each other. If one process 710a or 710b fails or goes down, the other process 710b or 710a will detect or be notified of the failure and can call the push controller 711a or 711b at the remote site to re-generate the mirror process 710a or 710b.

Each process of the local and remote processes 710a, 710b can handle incoming communications sent from local message feeders (e.g., back-end servers, push data sources, and/or push engines that are located in or proximate to the site), and can forward (or relay) the incoming communication to its mirror process at the remote site if appropriate. As such, the mirror processes 710a, 710b can speed up push server system response when communications are first received in a site remote from the site at which the client mobile device is located.

Thus, the push server systems 103 described herein achieves high scalability by having a multi-tiered architecture. A load balancer 107 can lie between client mobile devices and one or more push engines, and can provide a first level of load balancing by dispatching requests from the mobile devices to different push engines depending on the load at each of the push engines. The push engine 109 can create a unique linked process (e.g., an Erlang process) for every received client request including an MDN or other identifier, and can forward the request to a push controller. The push engine 109 can be responsible for sustaining a persistent connection with the client mobile device, while relying on the push controller to perform processing relating to the persistent connection. A plurality of push controllers 111, distributed across multiple sites, can have linked processes (e.g., Erlang virtual server processes). Each push controller 111 can be allocated to a push controller group 112, and linked to other push controller(s) in the group by a linked process and/or a supervisor process. A second level of load balancing may be achieved when a push engine 109 dispatches client requests to different push-controller groups 112 based on a client mobile device identifier (e.g., a client MDN) in the request. Upon receiving a request from a push engine 109, a push controller 111 can create a process for every unique identifier/MDN, and the process can maintain the basic client record for that request. The basic client record can include information such as a valid session ID, a session ID Time-to-Live, and a valid application ID list. The two levels of load balancing can distribute large numbers of requests (e.g., millions of requests) equally across different push engines and push controllers. The two levels of load balancing can also distribute requests to push engines and push controllers newly added to the push server system, as more push engines and push controllers are added to an existing push messaging infrastructure to support large numbers of client mobile devices and requests.

The push server systems 103 described herein further achieves high availability through two additional design attributes of push controllers 111: single site failover and multi-site (or cross-site) mirroring. The single site failover design can provide an always-on interface to the back-end server 113, the push data sources 106, and the push engines 109. At the push controller 111, two interface processes 510a, 510b, are created on each push controller group 512 as shown in FIG. 5. These two interface processes 510a, 510b, can be monitored by a supervisor process which ensures that the processes are automatically and promptly restarted on any unexpected failure or exit. One of the two processes 510a, 510b, works as an active interface process (i.e., the GRP) and the other works as a redundant interface (i.e., the backup process), and the two processes are linked to each other using an inter-process link. Hence, the active interface process can recreate the redundant interface process once the redundant process fails. In addition, the redundant interface process can convert itself to become the active process and can recreate the redundant interface process if the originally active process fails.

According to the multi-site (or cross-site) mirroring design, upon the creation of a linked process 110a associated with a particular client mobile device (or MDN) in the push-controller 111a, a mirror process 110g can be created on a remote site's mirror push controller 111g. As shown in FIG. 2, after a client mobile device 101a at a first site (e.g., Site A) requests a connection to a push engine 109, a push controller 111a on the same first site creates a local process 110a. The push controller 111a can then make a remote call to create a mirror process 110g on a push controller 111g at a second site (e.g., Site B). The active process 110a and the mirror process 110g are linked to each other by using an inter-process link. If one of the linked processes 110a, 110g fails or dies, the other process 110g, 110a in that link is immediately notified about the failure through the inter-process link. In addition, if a push data source 106 sends a message for a client 101a to the mirror process 110g, the mirror process 110g can redirect the message from the push data source 106 if the active process 110a is not active or alive. If the mirror process 110g fails or dies, the active process 110a can create a new mirror process 110g immediately. The active and mirror processes 110a, 110g are able to share information about the client mobile device 101a associated with the processes, in order to keep each other's client record information current.

Figure 8A:
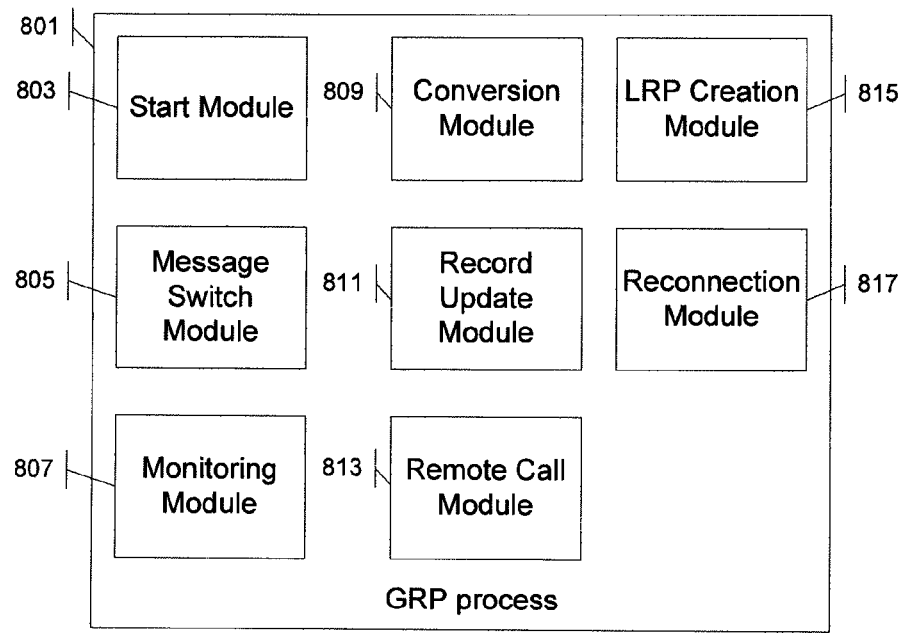
FIGS. 8A and 8B are block diagrams showing modules of a global registered process (GRP) and a local registered process (LRP), respectively.
Figure 8B:
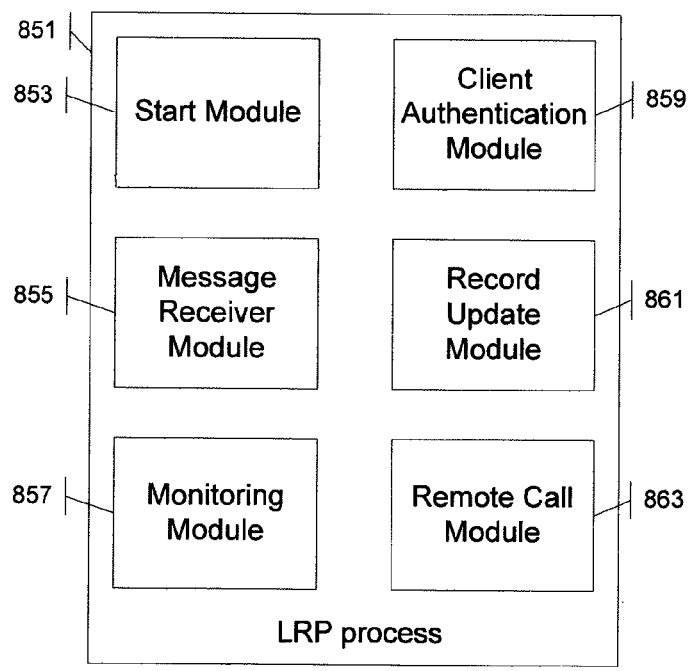

FIGS. 8A and 8B respectively show modules of a global registered process (GRP) and a local registered process (LRP) generated and running on a push controller of the push server system.

The GRP 801 of FIG. 8A includes a start module 803, a message switch module 805, a monitoring module 807, a conversion module 809, a record update module 811, a remote call module 813, a LRP creation module 815, and a reconnection module 817.

The start module 803 may be called by a push controller to initialize the GRP generation process, and may also be used to create the backup process of GRP.

The record update module 811 may update the records that are carried by a GRP process or its backup process. In particular, the record update module 811 may update records that may be stored by the GRP including the process ID of the GRP process, the process ID of the backup process, and the status of the process indicating whether the process is a GRP or backup process.

The message switch module 805 may receive communications (e.g., data, messages, or the like) pushed from a back-end server; forward such communications to LRP processes; handle the authentication request received from a push engine by calling a LRP creation module to create a LRP process and forwarding the request to that LRP process; and receive the acknowledge message that can be sent from a backup process to indicate the backup process is created successfully.

The LRP creation module 815 may create a new LRP process.

The conversion module 809 may convert the backup process to a GRP process, and may be triggered when an original GRP process is down and the status change is captured by the backup process. After conversion, the conversion module 809 may call the remote call module 813 to create a new backup process on a peer push controller.

The monitoring module 807 may monitor the connection between its own push controller and a peer push controller in a same push controller group; monitor the backup process if the running process is GRP; and/or monitor the GRP process if the running process is a backup process of the GRP. If the connection between two push controller nodes is down, the monitoring module 807 may call the remote call module 813 to stop trying to create backup process of GRP. On the contrary, if the connection between two push controller nodes is up, the monitoring module 807 may call the remote call module 813 to create a new backup process on the peer push controller node in the same group. If the monitoring module 807 notices the GRP process is down, which may indicate the running process is a backup process, the monitoring module 807 may call the conversion module 809 to convert the running process to a GRP process. If the monitoring module 807 notices the backup process is down, which indicates that the running process is a GRP process, the monitoring module 807 may call the remote call module 813 to recreate a backup process of the GRP on a peer push controller node in the same group.

The remote call module 813 may call the peer push controller node in a same group to create a backup process of the GRP. The remote call module 813 can be triggered in two scenarios. First, the remote call module 813 can be triggered when the message switch module 805 has not received an acknowledge message from a backup process within a pre-set time. Second, the remote call module 813 can be triggered when the backup process is down.

The reconnection module 817 may be responsible for either recreating a dead LRP or re-linking the push engine process and the LRP upon network disconnections. An LRP could die for several reasons. For example, when the GRP module exits, all LRPs associated with the GRP may die. Alternatively, if the push controller node goes down, the respective LRPs may die as well.

As mentioned before, the LRP can hold records for a client including such information as a MDN, a session ID, a session ID Time-to-Live, a registered application ID list, and the like. When the LRP exits, the client records associated with the LRP may be lost and the corresponding linked push engine process may receive an EXIT signal. If the network between the push engine and push controller goes down, the push engine process may receive an EXIT signal as well. The push engine process may request the GRP to recreate the LRP process. The GRP may use the client MDN passed by the push engine to first verify if the corresponding LRP is alive. If the LRP is alive, the GRP just may create an inter-process link (e.g., an Erlang link) between the push engine and push controller processes. If the LRP is dead, the GRP first may create the LRP and the LRP may retrieve the client's records from the back-end server and populate itself with the retrieved client's records. Using this process, the push server system may be able to recover from any local or network error, and to re-establish the link between the push engine and the push controller process for a given client device without interrupting the client device.

The LRP 851 of FIG. 8B can include a start module 853, a message receiver module 855, a monitoring module 857, a client authentication module 859, a record update module 861, and a remote call module 863.

The start module 853 can be called by a push controller to initialize the LRP process and register the LRP with an MDN as the process's name.

The client authentication module 859 can call the backend server to verify a client mobile device's credentials, and return the validation results to the push engine.

The record update module 861 can update the records that are carried by the LRP process. In each LRP process, records may be kept and updated, including records for: a creation time of the LRP process; a status of the LRP process, such as if the push controller is connected to the push engine, if the mirror LRP process is connected, and if the local LRP process and the mirror LRP process are connected; a process ID of the push engine; a process ID of the caller process on the push controller, wherein the caller process calls the start module to create a LRP process, which is named as global registered process (GRP) in push platform; and a client credential record.

The receiver module 855 may receive the pushed messages that are sent from a backend server, and may forward these messages to a push engine immediately. The receiver module 855 may also receive the acknowledge message from a mirror LRP process which indicates the mirror LRP process is created successfully.

The monitoring module 857 may monitor the up/down status of mirror LRP process(es), the GRP process, and the push engine process. If any of these processes is down, the monitoring module 857 can trap the status changes, and can then trigger the record update module 861 to update the record. Particularly if the mirror LRP process is down, the monitor module 857 can also call the remote call module to recreate the mirror LRP process on the remote site.

The remote call module 863 may call the push controller on the remote site to create the mirror LRP process. The remote call module 863 may be called in the following two scenarios. First, the remote call module 863 may be called when the message receiver module 855 has not received acknowledgement from the mirror LRP process within a pre-set time interval. Second, the remote call module 863 may be called when the mirror LRP process is down.

Figure 9:
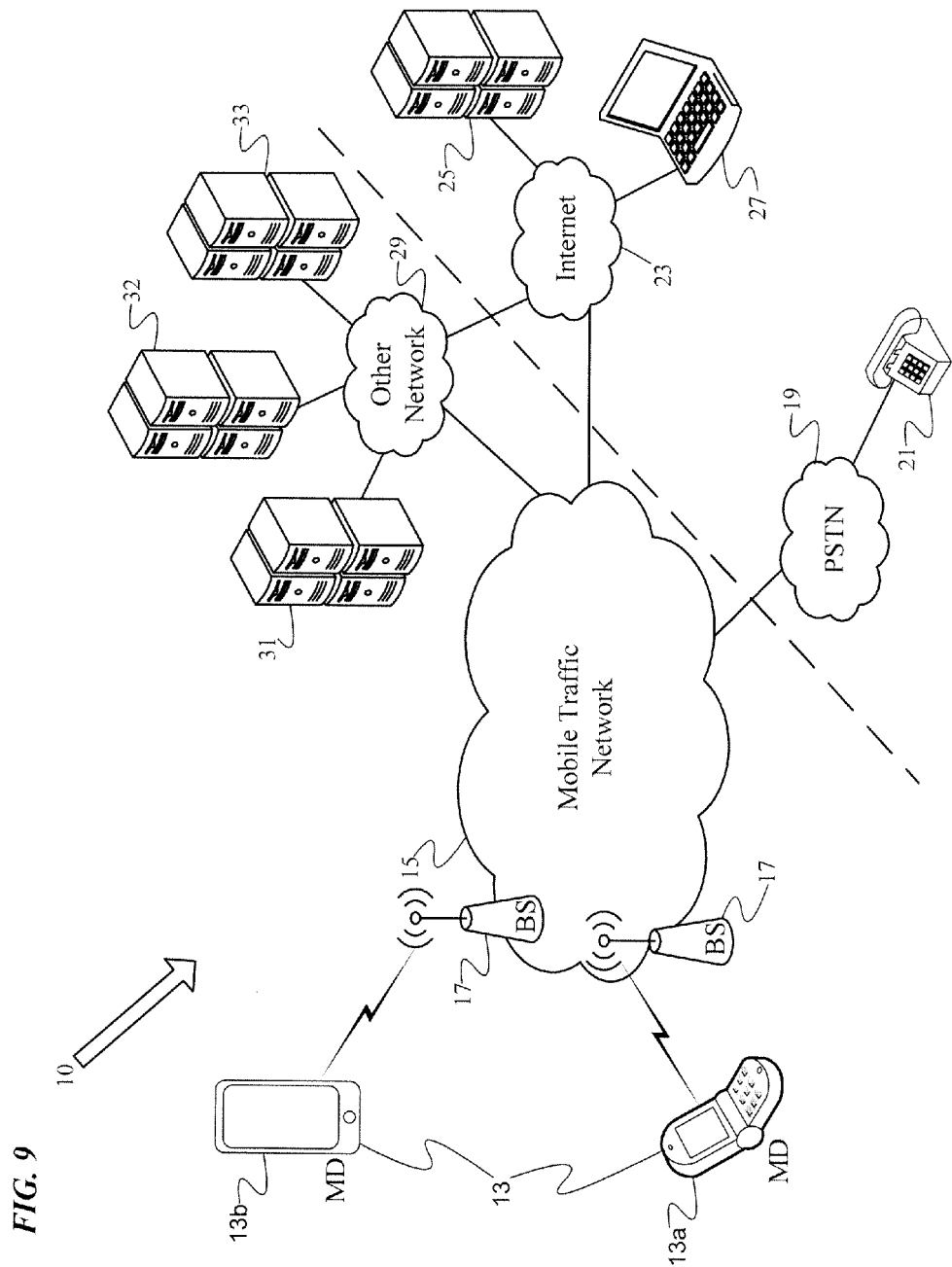
FIG. 9 is a high-level functional block diagram of an example of a system of networks/devices that provide various communications for client mobile devices and support an example of the push messaging service.

FIG. 9 illustrates a system 10 offering a variety of mobile communication services, including communications for push messaging services for users of client mobile devices using a push platform of a type described above. The example shows simply two client mobile devices (MDs) 13a and 13b as well as a mobile communication network 15. The devices 13a and 13b are examples of client mobile devices that may be used for the push messaging service. However, the network will provide similar communications for many other similar users as well as for mobile devices/users that do not participate in the push messaging service. The network 15 provides mobile wireless communications services to those devices as well as to other client mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, SS7-based networks, Ethernet/IP-based networks, or other standards used for public mobile wireless communications. The client mobile devices 13 may be capable of voice telephone communications through the network 15, and for the push messaging services, the exemplary devices 13a and 13b are capable of data communications through the particular type of network 15 (and the users thereof typically will have subscribed to data service through the network).

The network 15 allows users of the client mobile devices such as 13a and 13b (and other client mobile devices not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the client mobile devices 13 via the Internet 23 may be with devices like those shown at 25 and 27 as well as with a variety of other types of devices or systems capable of data communications through various interconnected networks. The client mobile devices 13a and 13b of users of the push messaging service also can receive and execute applications written in various programming languages.

Client mobile devices 13 can take the form of portable handsets, smart-phones or personal digital assistants, although they may be implemented in other form factors. Program applications, including an application to assist in the push messaging service and/or any an application making use of the push messaging service can be configured to execute on many different types of client mobile devices 13. For example, a client mobile device application can be written to execute on a binary runtime environment for mobile (BREW-based) mobile devices, a Windows Mobile based mobile device, Android, I-Phone, Java Mobile, or RIM based mobile device such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving client mobile devices 13, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the client mobile devices 13, when the client mobile devices are within range. Each base station can include a BTS coupled to several antennae mounted on a radio tower within a coverage area often referred to as a "cell." The BTS is the part of the radio network that sends and receives RF signals to/from the client mobile devices 13 that are served by the base station 17.

The radio access networks can also include a traffic network represented generally by the cloud at 15, which carries the user communications and data for the client mobile devices 13 between the base stations 17 and other elements with or through which the client mobile devices communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. The various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers or push data source servers 31, push server system servers 32 (e.g., load balancers, and back-end, middle-end, and front-end servers, etc.), and a related back-end/authentication server 33 for the push messaging services.

A client mobile device 13 communicates over the air with a base station 17 and through the traffic network 15 for various voice and data communications, e.g. through the Internet 23 with a server 25, with push data source servers 31, and/or with push server system servers 32. If the mobile service carrier offers the push messaging service, the service may be hosted on carrier operated push server system servers 32, for communication via the networks 15 and 29. Alternatively, the push messaging service may be provided by a separate entity (alone or through agreements with the carrier), in which case, the service may be hosted at least in part on a server such as server 25 connected for communication via the networks 15 and 23. Servers such as 25 and 32 may provide any of a variety of common application or service functions in support of or in addition to a push messaging application program running on the client mobile device 13. However, for purposes of further discussion, we will focus on functions in support of the mobile push messaging service. For a given service, including the push messaging service, a push messaging application program within the client mobile device may be considered as a 'client' or 'push messaging client' and the programming at 25, 31, 32, or 33 may be considered as the 'server' or the 'push messaging server' application for the push messaging service.

To insure that the push messaging service offered by servers 32 is available to only authorized devices/users, the provider of the push messaging service also deploys a back-end authentication server 33. The authentication server 33 could be a separate physical server as shown, or authentication server 33 could be implemented as another program module running on the same hardware platform as the servers 32. Essentially, when the push messaging server system (servers 32 in our example) receives a push messaging connection request from a push messaging client application on a client mobile device 13, the server system provides appropriate information to the back-end/authentication server 33 to allow server application 33 to authenticate the client mobile device 13 as outlined herein. Upon successful authentication, the server 33 informs the server system 32, which in turn provides access to the push messaging services via data communication through the various communication elements (e.g. 29, 15 and 17) of the network 10. A similar authentication function may be provided for push messaging service(s) offered via the server 25, either by the server 33 if there is an appropriate arrangement between the carrier and the operator of server 25, by a program on the server 25 or via a separate authentication server (not shown) connected to the Internet 23.

The enhanced push messaging service under consideration here may be delivered to touch screen type client mobile devices as well as to non-touch type client mobile devices. Hence, our simple example shows the client mobile device (MD) 13a as a non-touch type mobile station and shows the client mobile device (MD) 13b as a touch screen type mobile station. Implementation of the push messaging service will involve at least some execution of programming in the client mobile devices as well as implementation of user input/output functions and data communications through the network 15, from the client mobile devices 13.

As shown by the above discussion, functions relating to the enhanced push service may be implemented on computers connected for data communication via the components of a packet data network and a mobile network, operating as a load balancer, a front-end server configured as a push engine, a middle-end server configured as a push controller, and/or a back-end server configured as an authentication server, as shown in FIG. 9. Although special purpose devices may be used, such devices also may be implemented using one or more hardware platforms intended to represent a general class of data processing device commonly used to run "server" programming so as to implement the push messaging support functions discussed above, albeit with an appropriate network connection for data communication.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the push messaging service. The software code is executable by the processor(s) of the general-purpose computer that functions as the load balancer, as the front, middle, and back-end servers and/or the processor of a client mobile device. In operation, the code is stored within the general-purpose computer platform or client device. At other times, however, the software may be stored at other locations and/or transported for loading into the appropriate general-purpose computer system or client device. Execution of such code by a processor of the computer platform or client device enables the platform or client device to implement the methodology for push messaging services, in essentially the manner performed in the implementations discussed and illustrated herein.

Figure 10:
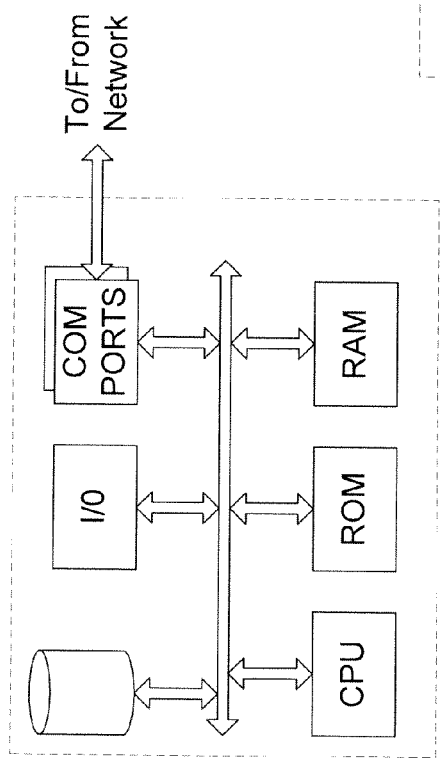
FIG. 10 is a simplified functional block diagram of a computer that may be configured as a host or server, for example, to function as the front-end, middle-end, or back-end server in the system of FIG. 1.
Figure 11:
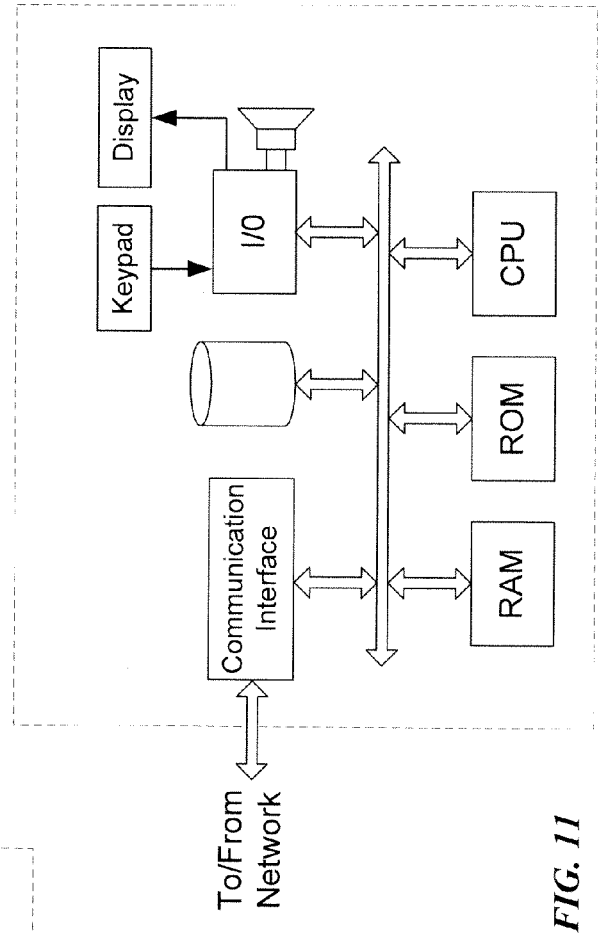
FIG. 11 is a simplified functional block diagram of a personal computer or other work station or client mobile device.

FIGS. 10 and 11 provide functional block diagram illustrations of general purpose computer hardware platforms. FIG. 10 illustrates a network or host computer platform, as may typically be used to implement a server. FIG. 11 depicts a computer with user interface elements, as may be used to implement a personal computer or other type of work station or terminal device, although the computer of FIG. 11 may also act as a server if appropriately programmed. It is believed that the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A push messaging server system, comprising:
    a load balancer;
    front-end servers configured as push engines to establish and maintain persistent connections through a mobile packet data network with mobile devices connecting to the push messaging server system, and to push messages containing data from one or more push sources to the mobile devices through the persistent connections; and
    middle-end servers configured as push controllers to maintain a basic record for each mobile device having a persistent connection with a push engine, and to route connection requests from the mobile devices and messages to the mobile devices between the push engines, back-end servers, and one or more push sources, wherein:
    the load balancer is configured to distribute new connection requests received from mobile devices across the push engines;
    each push engine is configured to establish and maintain a persistent connection, with a client on a mobile device, for each connection request received from the load balancer, and to forward the connection request to a push controller;
    each push controller is associated with a plurality of mobile device identifiers;
    each push controller runs a local registered process (LRP) for each mobile device having a persistent connection and having a device identifier with which the push controller is associated; and
    each LRP is configured to maintain for a respective mobile device the basic record, which includes connection and session information for the mobile device's persistent connection.

2. The push messaging server system of claim 1, wherein:
    each push controller has a dispatcher configured to forward each received connection request to a push controller associated with a mobile device identifier included in the received connection request.

3. The push messaging server system of claim 1, wherein:
    each push engine runs a linked process for each persistent connection with a respective mobile device; and
    each LRP, running on a push controller, for a mobile device, is linked to the linked process, running on the push engine, for the persistent connection with the mobile device.

4. The push messaging server system of claim 1, further comprising:
    the back-end servers, configured as authentication servers to receive connection requests from the mobile devices through the front-end and middle-end servers, to perform authentication based on a mobile device identifier included in each connection request, and to transmit to the middle-end servers authentication response messages.

5. The push messaging server system of claim 1, wherein:
    each of the middle-end servers is configured as a primary push controller;
    the push messaging server system further comprises servers respectively configured as backup push controllers with respect to the middle-end servers configured as primary push controllers; and
    each respective pair of primary and backup push controllers runs processes to enable the respective backup push controller to take over the function of the respective primary push controller upon a failure of the respective primary push controller.

6. The push messaging server system of claim 5, wherein the processes to enable the respective backup push controller to take over the function of the respective primary push controller include an Erlang supervisor process.

7. The push messaging server system of claim 5, wherein:
    each primary push controller runs a global registered process (GRP); and
    each backup push controller runs a backup process that is linked to the GRP of the paired primary push controller by an Erlang link.

8. The push messaging server system of claim 1, wherein:
each of the middle-end servers is configured as a primary push controller;
the push messaging server system further comprises servers respectively configured as mirror push controllers with respect to the middle-end servers configured as primary push controllers;
each mirror push controller is located geographically separately from the respective primary push controller, and
each respective pair of primary and mirror push controllers is configured to enable the respective mirror to take over a function of the respective primary push controller upon loss of network connectivity between the respective primary push controller and mobile devices associated with the respective primary push controller.

9. The push messaging server system of claim 8, wherein:
each mirror push controller runs a local registered process (LRP) for each LRP of the paired primary push controller, and
each LRP of the mirror push controller is configured to maintain at least part of the basic record maintained by a respective LRP of the paired primary push controller.

10. The push messaging server system of claim 9, wherein each LRP of the mirror push controller is linked to the respective LRP of the paired primary push controller by an Erlang link.

11. A method comprising steps of:
distributing, by a load balancer, new connection requests received from mobile devices across push engines;
establishing and maintaining, by a push engine for each connection request received from the load balancer, a persistent connection through a mobile packet data network with a client on a mobile device having an identifier;
forwarding, by the push engine for each connection request received from the load balancer, the connection request to a push controller;
generating, on the push controller, a local registered process (LRP) for each respective one of the mobile devices having an identifier associated with the push controller, wherein each LRP is configured to maintain for the respective mobile device a basic record which includes connection and session information for the respective mobile device; and
routing, by the push controller, connection requests received from the mobile devices through the push engines to a back-end server, and messages from the back-end server and one or more push sources to the mobile devices through the push engines and the persistent connections.

12. The method of claim 11, further comprising a step of:
forwarding by a dispatcher of the push controller, to another push controller, each received connection request having a mobile device identifier included in the received connection request that is associated with the other push controller.

13. The push messaging server system of claim 1, wherein the load balancer is distinct from the front-end servers configured as the push engines.

14. The method of claim 11, further comprising steps of:
running, on each push engine, a linked process for each persistent connection with a mobile device; and
linking each LRP, generated on the push controller for a respective mobile device, to the linked process for the persistent connection with the respective mobile device.

15. The method of claim 11, further comprising steps of:
receiving, on the back-end server configured as an authentication server, a connection request routed by the push controller;
authenticating a client device, by the back-end server, based on a mobile device identifier included in the received connection request; and
transmitting, from the back-end server to the push controller, an authentication response message based on a result of the authenticating the client device.

16. The method of claim 11, further comprising steps of:
generating, on the push controller, a global registered process (GRP); and
linking the GRP to a backup process running on another push controller configured as a backup push controller with respect to the push controller,
wherein the GRP and backup processes are configured to enable the backup push controller to take over the function of the push controller upon a failure of the push controller.

17. The method of claim 16, wherein the GRP and backup processes include an Erlang supervisor process.

18. The method of claim 16, wherein the GRP and backup processes are linked to by an Erlang link.

19. The method claim 11, further comprising:
associating, with the push controller, a mirror push controller located geographically separately from the push controller,
wherein the push controller and the mirror push controllers are configured to enable the mirror push controller to take over a function of the push controller upon loss of network connectivity between the push controller and mobile devices associated with the push controller.

20. The method of claim 19, wherein:
the mirror push controller runs a local registered process (LRP) for each LRP of the push controller, and
each LRP of the mirror push controller is configured to maintain at least part of the basic record maintained by the respective LRP of the push controller.

21. The method of claim 20, further comprising:
linking each LRP, generated on the push controller, to a respective LRP of the mirror push controller by an Erlang link.

* * * * *